United States Patent [19]

Hale

[11] Patent Number: 4,813,992
[45] Date of Patent: Mar. 21, 1989

[54] UNIVERSAL STEM MOLD APPARATUS

[75] Inventor: John R. Hale, East Hempfield Township, Lancaster County, Pa.

[73] Assignee: Thomson Consumer Electronics, Inc., Indianapolis, Ind.

[21] Appl. No.: 196,594

[22] Filed: May 20, 1988

[51] Int. Cl.[4] .......................................... C03B 23/217
[52] U.S. Cl. .................................... 65/140; 65/59.25;
     65/59.26; 65/59.27; 65/59.7; 65/139; 65/155
[58] Field of Search .................. 65/59.25, 59.26, 59.27,
     65/59.31, 59.32, 59.7, 138, 139, 155, 173, 140

[56] References Cited

U.S. PATENT DOCUMENTS

| | | | |
|---|---|---|---|
| 2,312,003 | 2/1943 | Schneider et al. | 65/140 |
| 2,313,025 | 3/1943 | Scharfnagel | 65/138 |
| 2,338,507 | 1/1944 | Haas et al. | 250/27.5 |
| 2,340,879 | 2/1944 | Horn | 65/54 |
| 2,618,904 | 11/1952 | Gartner | 65/140 |
| 3,201,216 | 8/1965 | Handmann | 65/138 |
| 4,165,227 | 8/1979 | Nubani et al. | 65/59.28 |

OTHER PUBLICATIONS

U.S. patent application, Ser. No. 114,356, filed on Oct. 29, 1987, by J. R. Hale titled, APPARATUS AND METHOD FOR MANUFACTURING A MOLDED GLASS STEM, U.S. Pat. No. 4,767,436.

*Primary Examiner*—Arthur Kellogg
*Attorney, Agent, or Firm*—Eugene M. Whitacre; Dennis H. Irlbeck; Vincent J. Coughlin, Jr.

[57] ABSTRACT

An apparatus used to manufacture a molded glass stem comprises a plurality of conventional lower stem mold assemblies and a plurality pre-heating, heating, forming, and annealing stations. The forming stations include at least one primary forming station having a primary upper stem mold assembly and at least one secondary forming station having a secondary upper stem mold assembly. The primary upper stem mold assembly includes a primary universal stem mold having primary fillet-forming means formed in a first mold block thereof. The secondary upper stem mold assembly includes a secondary universal stem mold having secondary fillet-forming means formed in a second mold block thereof. The primary fillet-forming means includes a plurality of longitudinal fillet-forming openings formed through the first mold block of the novel primary universal stem mold. A plurality of novel primary inserts are replaceably disposed within the openings in the first mold block. A recess is provided in each of the inserts for contacting the glass of the stem to preshape the fillets. The second fillet-forming means includes a plurality of longitudinal fillet-forming openings formed through the second mold block of the novel secondary universal stem mold. A plurality of secondary inserts are replaceably recessed within the openings in the second mold block. The fillets are shaped by capillary action between the glass of the stem and the wall surrounding longitudinal openings formed in the second mold block of the secondary universal stem mold.

2 Claims, 4 Drawing Sheets

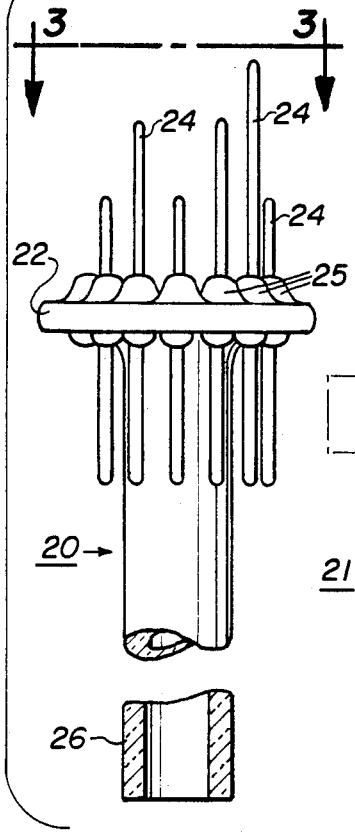
Fig. 2
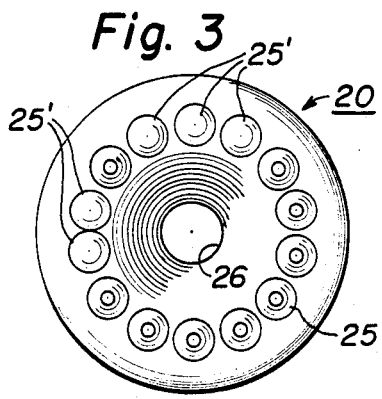
Fig. 3
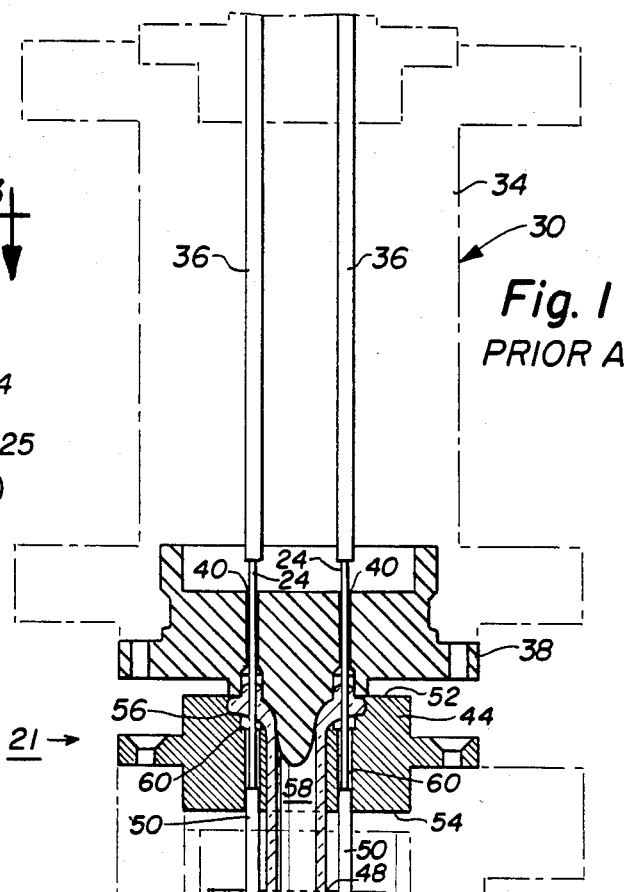
Fig. 1
PRIOR ART
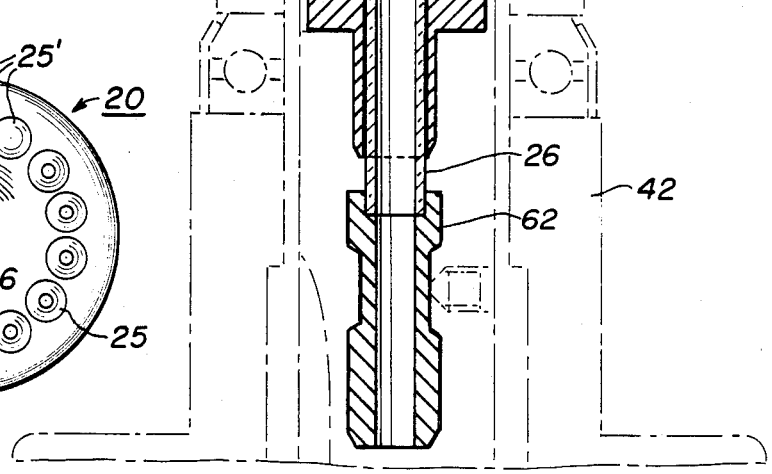

UNIVERSAL STEM MOLD APPARATUS

BACKGROUND OF THE INVENTION

The invention relates to an apparatus for manufacturing a glass stem, and more particularly, to an apparatus having a plurality of forming stations each of which has a universal stem mold including a mold block having a plurality of novel fillet-forming means therein. The fillet-forming means at one of the stations is different from the fillet-forming at at least one other station.

In the prior art, it is known to have a stem manufacturing apparatus comprising a plurality of forming stations. Two, three or even four stations are commonly utilized. In the process of forming glass stems for vacuum devices, a body of glass, a tubulation and a plurality of lead-in conductors (or leads) are positioned on a rotatable lower portion of a stem mold assembly, heated and subsequently pressed by a conventional upper portion of the stem mold assembly, when the glass reaches the proper temperature, to form the glass stem. The forming of pressing operation is frequently repeated, two, three or even four times on the same stem to insure that a proper leak-tight well-defined stem is produced. In one type of conventional stem manufacturing apparatus described hereinafter, four separate, pressing stations are utilized. Stations one and two are identical to each other, and stations three and four are also identical to each other but different from stations one and two. The upper stem mold assembly of each station, and particularly the mold blocks, which contact the molten glass, and locate and form the fillets of the stem, are expensive items to manufacture. Each mold block requires precision machining, and the drilling of long small diameter holes to tight tolerances with no taper to the holes. Because of this requirement, upper stem mold assemblies are not only expensive and difficult to make, but manufacturers are reluctant to change stem designs, for example to change either the inner lead diameter or length, the fillet shape, the location of a dummy fillet, or the number of leads or dummy fillets per stem because each change required the manufacturing of a different upper mold block.

The mold blocks, of course, have a finite life and it is necessary to replace them when failure occurs. Such failure is caused by hot glass which erodes the bridges between adjacent fillets and causes reentrant angles which results in cracked stems. Mold block failure also occurs because the hot nickel leads of the lead-in conductors wear the centering holes which orient the stem leads and cause the holes to become oblong causing bent pins and pin circle displacement.

The need thus exists for a simpler, cost effective apparatus for forming glass stems and in particular for an apparatus which utilizes a common mold block at each forming station but novel fillet-forming means to provide the station-to-station differences required to produce different types of stems or replace worn components at reasonable cost.

SUMMARY OF THE INVENTION

An apparatus useed for manufacture a molded glass stem comprises a plurality of lower stem mold assemblies and a plurality of pre-heating, heating, forming, and annealing stations. The forming stations include at least one primary forming station having a primary upper stem mold assembly and at least one secondary forming station having a secondary upper stem mold assembly. The primary upper stem mold assembly includes a plurality of lead-weights and a primary universal stem mold having primary fillet-forming means formed in a first mold block thereof. The secondary upper stem mold assembly also includes a plurality of lead-weights and a secondary universal stem mold having secondary fillet-forming means formed in a second mold block thereof. The apparatus is improved by having the primary fillet-forming means include a plurality of fillet-forming openings formed through the first mold block of the novel primary universal stem mold. A plurality of novel primary inserts are replaceably disposed within the openings in the first mold block of the primary universal stem mold. Each of the inserts has a first end and an oppositely disposed second end with a recess provided in the first end thereof for contacting the glass of the stem to preshape the fillet. Each of the inserts has a lead-accommodating opening therein extending from the recess into the insert. The second end of each of the inserts is is contact with a different one of the lead-weights to retain the primary inserts within the openings in the first mold block of the primary universal stem mold. The second fillet-forming means includes a plurality of fillet-forming openings formed through the second mold block of the novel secondary universal stem mold. A plurality of novel secondary inserts are replaceably recessed within the openings in the second mold block of the secondary universal stem mold. Each of the secondary inserts has a first end and an oppositely disposed second end with a lead-in conductor orienting recess provided in the first end thereof for directing the lead-in conductor into a lead-accommodating opening extending from the orienting recess into the insert. The fillets are shaped by capillary action between the glass of the stem and the walls of the fillet-forming openings formed in the second mold block of the secondary universal stem mold. The second end of each of the inserts is in contact with a different one of the lead-weights to retain the secondary inserts within the openings in the second mold block of the secondary universal stem mold.

The lower stem mold assemblies are conventional and compliment the action of the primary upper stem mold assembly and the secondary upper stem mold assembly.

BRIEF DESCRIPTION OF THE DRAWINGS

FIG. 1 is a cut-away sectional view of a conventional stem mold.

FIG. 2 shows a partial cut-away longitudinal view of a stem made using the apparatus of the present invention.

FIG. 3 shows the top view taken along line 3—3 of FIG. 2.

DETAILED DESCRIPTION OF THE PREFERRED EMBODIMENT

Figure 4:
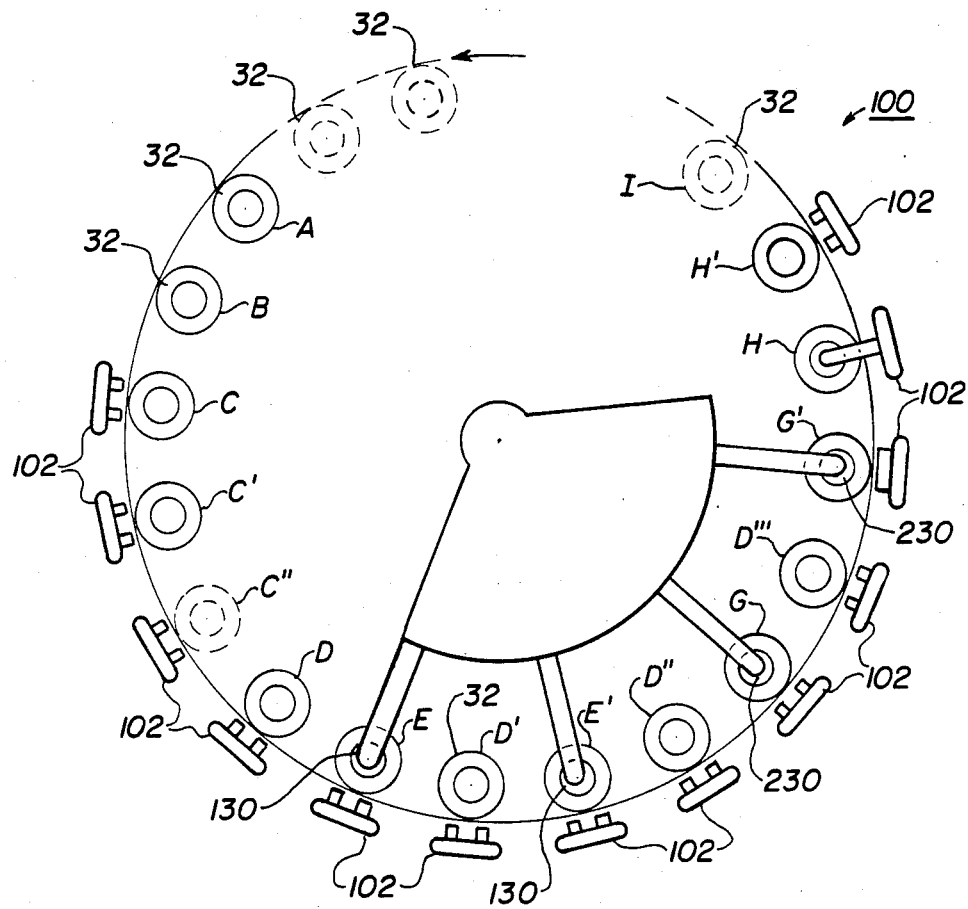
FIG. 4 shows a top view of a rotary stem machine comprising a plurality of stations for manufacturing a glass stem according to the present invention.

FIGS. 1, 2 and 3 show a stem 20 and a conventional stem mold 21. The stem 20 is used in an electron tube such as a cathode-ray tube, CRT. The stem 20 includes a glass disk 22 having a plurality of lead-in conductors or leads 24 extending through a plurality of fillets 25. One or more dummy fillets 25', i.e., fillets without lead-in conductors therethrough, also are provided for orientation and electrical isolation purposes, as is known in the art. The leads 24 may all have the same inner length, or they may have different inner lengths as described in my copending U.S. patent application Ser. No. 114,356 filed on Oct. 29, 1987, now U.S. Pat. No. 4,767,436 and entitled, APPARATUS AND METHOD FOR MANUFACTURING A MOLDED GLASS STEM. A tubulation 26 is integral with the glass disc 22 and provides a means for evacuating and sealing the evacuated electron tube (not shown).

As shown in FIG. 1, the stem 20 is made by using the apparatus 21 which comprises an upper stem mold assembly 30 and a lower stem mold assembly 32. The upper stem mold assembly 30 includes an upper stem mold 34 (only a portion of which is shown) having therein a plurality of lead-weights 36. A mold block 38 is attached to one end of the stem mold 34. A plurality of apertures 40 are formed longitudinally through the body of the mold block 38 to accommodate the interior portions of the leads 24 of the stem 20. The lower stem mold assembly 32 includes a lower stem mold body 42 with a second stem mold 44 attached thereto. The lower stem mold assembly 32 includes a movable support platform 46 having a centrally disposed tubulation recess 48 formed therein. A plurality of supports 50 are attached to the support platform 46. The second stem mold 44 has a first surface 52 and an oppositely disposed second surface 54 which is spaced from the first surface. A stem-forming recess 56 is formed in the first surface 52 of the second stem mold 44. A centrally disposed tubulation aperture 58, formed in the bottom of the stem forming recess 56, communicates with the second surface 54 of the second stem mold 44. The recess 56 further includes a plurality of lead-in cavities 60 which circumscribe the tubulation aperture 58 and extend from the recess 56 to the second surface 54 of the second stem mold 44. The cavities 60 are aligned with the supports 50 and a portion of each of the supports 50 is disposed within the cavities 60. The tubulation 26 of the stem 20 rests on a tubulation support 62 and a lower portion of the lower stem mold assembly 32. The lead weights 36 rests upon the internal portions of the leads 24 and provide sufficient weight to hold the external portions of the leads 24 firmly against the supports 50 in the lower stem mold assembly 32. This prior art stem mold configuration requires that the lead-weights 36 by carefully designed to contact the leads 24 without bending the leads and damaging the stem. Variations in the length of the leads 24 may be achieved by the apparatus described in my copending U.S. patent application Ser. No. 114,356 now U.S. Pat. No. 4,767,436 referenced herein. A drawback of the prior art stem mold configuration and the stem mold configuration described in my copending patent application is that, in a multi-station stem manufacturing apparatus, the glass contacting portion of each of the upper stem mold assemblies differs slightly in design from station to station. Where two, three, or even four forming stations are provided in the stem manufacturing apparatus, significant expenses are incurred in providing the proper upper stem mold assemblies.

Figure 5:
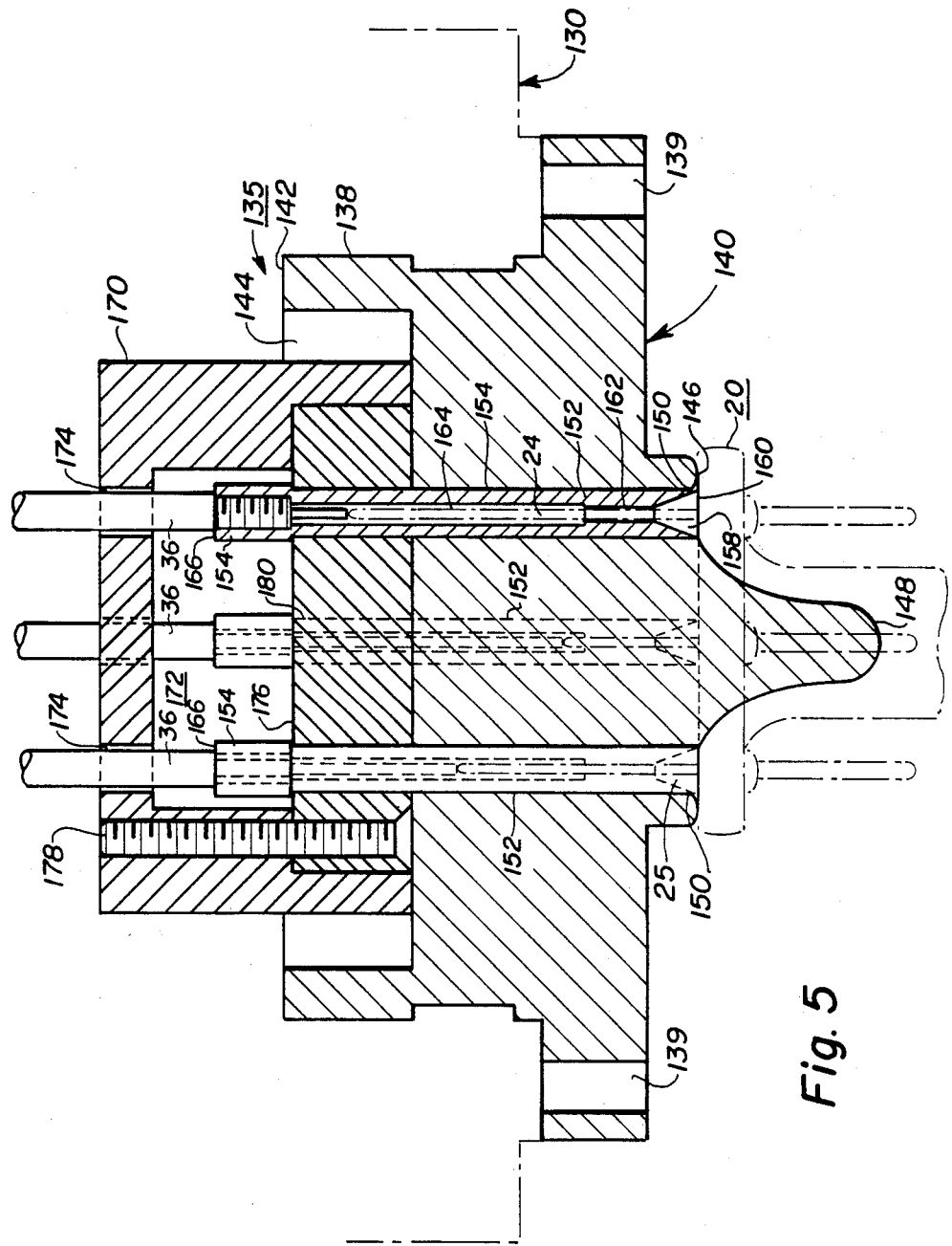
FIG. 5 shows a primary upper stem mold assembly of the present invention.

FIG. 4 shows a rotary stem machine 100 utilizing the novel universal stem mold apparatus of the present invention. The rotary stem machine utilizes a plurality of common, conventional lower stem mold assemblies 32 which index a counter-clockwise direction from station to station. With reference to FIG. 4, only some of the thirty stations, which are provided on the stem machine 100, are shown. At station A, leads (not shown) are automatically positioned in the lower stem mold assembly 32. The lower stem mold assembly 32 indexes in a counter clockwise direction to position B, where the tubulation (not shown) and glass body or bushing (also not shown) are loaded onto the lower stem mold assembly. The lower stem mold assembly continues to index station-to-station through a plurality of pre-heating positions, C, C' and C" and then on to a heating station, D. A plurality of heaters, 102, are adjacent to each of the stations. A primary forming station, E provides an initial forming of the stem 20 (not shown in FIG. 4). At station E, the first pressing station, a primary upper stem mold assembly 130 engages the lower stem mold assembly 32 to press the preheated glass therebetween. As shown in FIG. 5, the leads 24 extend into inserts 152 in the upper stem mold assembly 130 so that the leads are not damaged during the pressing operation. Also, the fillets 25 (25' not shown) are roughly formed in this first pressing or forming operation. The roughly formed stem 20 indexes to position D on its lower stem mold assembly 32. The upper stem mold assembly 130 does not index but remains fixed. The lower stem molds assembly 32 transports the stems 20 around the stem machine 100. At position D', the roughly completed stem 20 is reheated by burners 102 to permit a second pressing or forming at a secondary primary pressing station E'. This is a redundant pressing operation and an identical upper stem mold assembly 130 is used.

After the second pressing operation, the stem 20 is again indexed to another reheating position, D", and then indexed to an initial secondary pressing station, G, which differs from the primary pressing stations, E and E' in that the fillets 25 (25' not shown) are further shaped at this latter station. Following the initial secondary pressing operation, the stem 20 moves to another reheat position D"', and then to a final secondary pressing station designated G'. The secondary pressing stations G and G' utilize a secondary upper stem mold assembly 230, shown in FIG. 6. The stem has now been pressed a total of four times and the fillets 25 as well as the body of the stem comprising the disk 22 and the tubulation 26, are properly formed. The completed stem 20 now is moved to a fire-polishing position H and then to an annealing station H'. The completed stem 20 continues around the machine until it is removed at an unloading position (not shown) and sent through an annealing oven (also not shown). This process is repeated several hundred times each hour to provide the stems for the electron tube such as a CRT.

FIG. 5 shows a novel universal stem mold 135 having a mold block 138 which is attached to the upper stem mold assembly 130 by screws (not shown) extending through apertures 139. The mold block 138 has a first surface 140 and an oppositely disposed second surface 142. A cavity 144 is formed in the second surface 142. The first surface 140 includes a stem press or glass contacting portion 146 having centrally disposed projection 148 extending away from the stem press portion. A plurality of longitudinal fillet forming openings 150 circumscribe the projection 148. The fillet forming openings 150 are formed through the mold block 138 from the stem press portion 146 to the cavity 144. Each of the openings 150 has a diameter of 2.91 mm and lies on a 15.44 mm pin circle. Preferably fourteen openings are provided. A plurality of novel inserts 152 are replaceably disposed within a different one of the openings 150 in the mold block 138 of the primary upper stem mold assembly 130. Each of the inserts 152 has a first end 160 and an oppositely disposed second end 166 with a recess 158 provided in the first end 160. The inserts 152 have an overall length of about 29.3 mm (1.153 inch) and a diameter of 2.87 mm. The construction of the mold block 138 and its inserts 152 is described in my copending U.S. patent application entitled UNIVERSAL STEM MOLD FOR MANUFACTURING A MOLDED GLASS STEM, filed concurrently herewith and incorporated by reference herein for the purpose of disclosure. The recess 158 of the insert 152 contacts the molten glass of the stem 20 to roughly shape the fillet 25 during the initial pressing operation. Each of the inserts 152 has a lead accommodating opening 162 therein which extends from the recess into the insert. A channel 164 is formed in the insert 152 and extends from the second end 166 to the opening 162. As shown in FIG. 5, the leads 24 may be of various lengths and the leads are accommodated within the lead accommodating openings 162 and the channel 164. A lead stop 168 extends into the channel 164 in the insert from the second end thereof and acts as a stop for the lead-in conductors 24. One such stop 168 is shown in the hatched insert 152 of FIG. 5. Other stops 168 are shown in phantom in the other two inserts depicted in FIG. 5. The lead stops 168 can be of a length sufficient to accommodate lead-in conductors of different inner lengths.

A lead weight translator 170 is disposed within the cavity 144 formed in the second surface of the mold block 138. The translator 170 has a translator recess 172 formed therein. A plurality of lead-weight apertures 174 extend through the translator. A pin holder 176 is secured to the translator 170 by, for example, screws 178 (only one of which is shown). The pin holder 176 has a plurality of pin apertures 180 therethrough which are aligned with the openings 150 in the mold block 138 and also with the lead weight apertures 174 in the translator 170. The plurality of inserts 152 are disposed within the pin apertures 180 and extend into the openings 150 in the mold block 138. Each of the inserts 152 has a shank portion 154 which has a first diameter that permits the insert 152 to pass through the pin aperture 180 of the pin holder 176 and also to pass through the openings 150 in the mold block 138. Each of the inserts 152 has a shoulder 154 with a second diameter larger than the first diameter to prevent the insert 152 from slipping through pin apertures 180 in the pin holder 176 when the primary upper mold head assembly 130 is raised following the pressing and forming operation. The lead-weights 36 which contact the second end 166 of the inserts 152 maintain the inserts within the openings 150 in the mold block 138 to properly form the fillets 25 and also to insure that the first end 160 of the insert 152 is adjacent the stem press portion 146 of the mold block 138.

Figure 6:
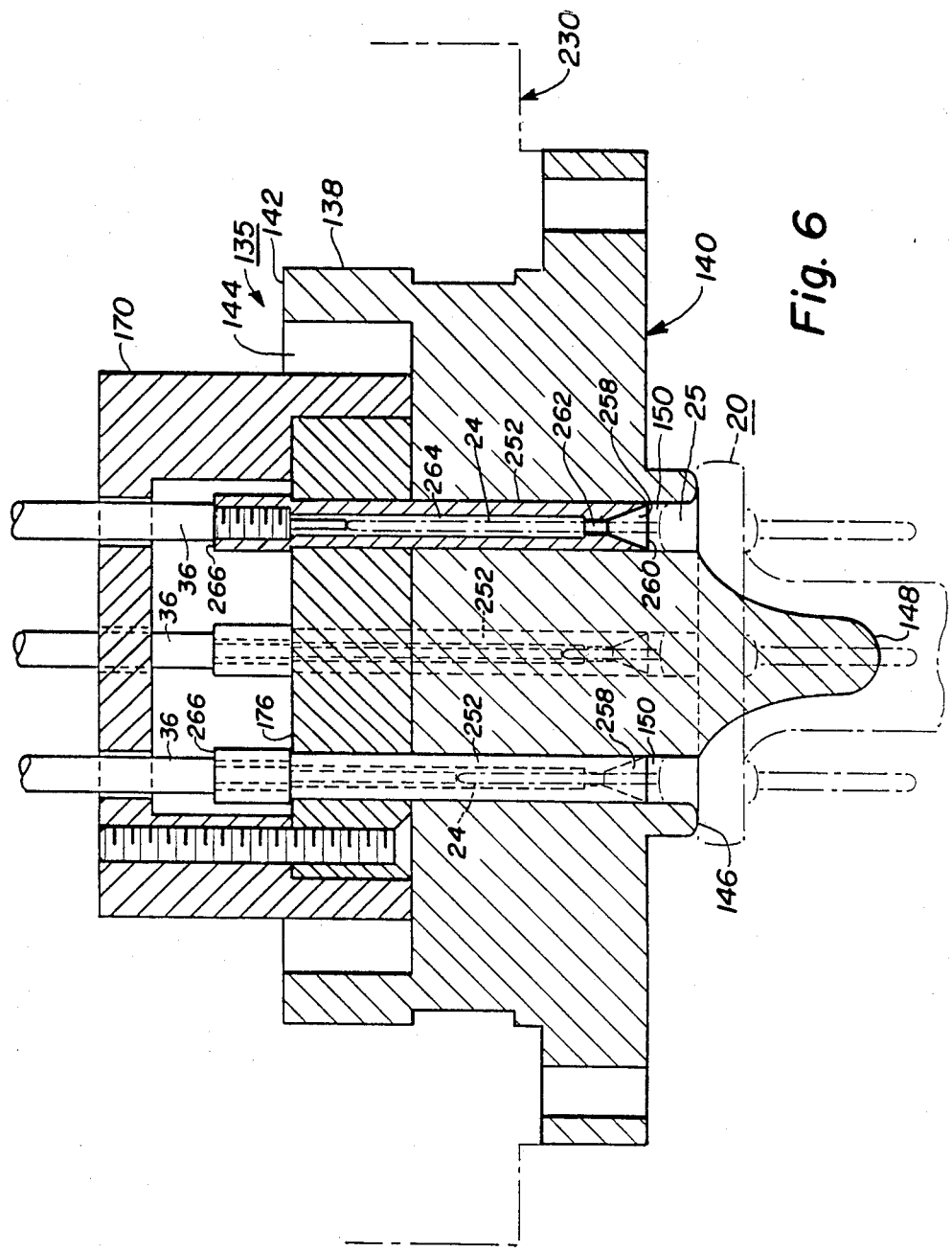
FIG. 6 shows a secondary upper stem mold assembly of the present invention.

In the rotary stem machine shown in FIG. 4, a primary upper stem mold assembly 130 of the type shown in FIG. 5 is located at stem press stations E and E'. The secondary upper stem mold assembly 230, shown in FIG. 6 is similar to that described in FIG. 5 except that the insert 252 are recessed within the openings 150 of the mold block 138. The mold block 138 for the secondary stem mold assembly 230 is identical to the mold block for the primary stem mold assembly 130. The only difference between the primary and secondary stem mold assemblies is in the lengths of the inserts 152 and 252. The inserts 152 have a length of 29.3 mm whereas the inserts 252 have a length of 26.2 mm. The secondary fillet forming means of the secondary stem mold assembly 230 includes a plurality of longitudinal fillet-forming openings 150 formed in the glass contacting surface 146 of the mold block 138. The openings 150 extend into the recess 144 formed in the second surface 142 of the mold block 138. The inserts 252 differ from the inserts 152 in that the overall length of the inserts 252 is shorter so that the inserts 252 are recessed about 3.1 mm from the glass-contacting surface 146 of the mold block 138. The lead-weight translator 170 and the pin holder 176 are identical to those described with respect to the primary upper stem mold assembly 130. A first end 260 of the insert 252 is spaced from the glass contacting end 146 of the mold block 138 to provide a sufficient volume of glass to form the fillets 25 and 25'. A second end 266 of the insert 252 extends above the pin holder 176 and is contacted by the lead-weights 36. A recess 258 formed in a first end 260 of the insert 252 does not contact the fillet of the stem but instead serves to direct and orient the leads 24 into a lead accommodating opening 262 and channel 264 in the insert 252. The fillets 25 and the dummy fillets 25' are shaped by capillary action between the molten glass of the stem and walls of the longitudinal fillet-forming openings 150 formed in the mold block 138.

In the rotary stem machine shown in FIG. 4 there are two secondary stem mold positions indicated as G and G'. Each of these positions uses a secondary upper stem mold assembly 230 of the type shown in FIG. 6.

The novelty in the present stem making apparatus resides in the use of two different universal stems molds at the different forming stations to fabricate the stem 20. Each of the novel universal stem molds 135 and 235 utilizes the common mold block 138 having large diameter openings 150 formed therethrough. Inserts 152 or 252 are disposed within the openings 150. If the inserts 152 are utilized, the resultant structure is the primary universal stem mold 135; however, if the inserts 252 are disposed within the openings 150, the resultant structure is the secondary universal stem mold 235. The use of two different universal stem molds comprising a common mold block 138 and inserts 152 or 252 provides an inexpensive alternative to costly, accurately machined individual mold heads for each forming station.

What is claimed is:

1. In an apparatus for manufacturing a molded glass stem for an electron tube, said stem comprising a tubulation, a body including a plurality of fillets and a plurality of lead-in conductors extending through said fillets, said apparatus comprising a plurality of lower stem mold assemblies and a plurality of pre-heating, heating, forming, and annealing stations, said forming stations including at least one primary forming station having a primary upper stem mold assembly, and at least one secondary forming station having a secondary upper stem mold assembly, said primary upper stem mold assembly including a plurality of lead-weights and primary fillet-forming means, said secondary upper stem mold assembly including a plurality of lead-weights and secondary fillet-forming means, wherein the improvement comprises a primary universal stem mold including a first mold block, said primary fillet-forming means including a plurality of fillet-forming openings formed through said first mold block, and a plurality of primary inserts replaceably disposed within said openings in said first mold block, each of said inserts having a first end and an oppositely disposed second end with a recess provided in said first end thereof for contacting the glass of the stem to preshape said fillets, each of said inserts having a lead-accommodating opening therein extending from said recess into said insert, said second end of each of said inserts being in contact with a different one of said lead-weights to retain said primary inserts within said openings in said first mold block of said primary universal stem mold;

a secondary universal stem mold including a second mold block, said secondary fillet-forming means including a plurality of fillet-forming openings formed through said second mold block assembly; and a plurality of secondary inserts replaceably recessed within said openings in said second mold block, each of said inserts having a first end and an oppositely disposed second end with a lead-in conductor orienting recess provided in said first end thereof for directing said lead-in conductor into a lead-accommodating opening extending from said orienting recess into said insert, said fillets being shaped by capillary action between the glass of said stem and the walls surrounding said fillet-forming openings formed in said second mold block, said second end of each of said inserts being in contact with a different one of said lead-weights to retain said secondary inserts within said openings in said second mold block of said secondary universal stem mold.

2. In an apparatus for manufacturing a molded glass stem for an electron tube, said stem comprising a tubulation, a body integral therewith having a plurality of fillets and a plurality of lead-in conductors extending through said fillets, said apparatus comprising a plurality of lower stem mold assemblies and a plurality of pre-heating, heating, forming and annealing stations, said forming stations including at least one primary forming station having a primary upper stem mold assembly, and at least one secondary forming station having a secondary upper stem mold assembly, said primary upper stem mold assembly including a plurality of lead-weights and primary fillet-forming means, said secondary upper stem mold assembly including a plurality of lead-weights and secondary fillet-forming means extending, wherein the improvement comprises a primary universal stem mold including a first mold block having a glass-contacting surface and an oppositely disposed second surface, said primary fillet-forming means including a plurality of longitudinal fillet-forming openings formed in said glass-contacting surface and extending through said first mold block, and a plurality of primary inserts replaceably disposed within said openings in said first mold block, each of said inserts having a first end and an oppositely disposed second end with a recess provided in said first end thereof for contacting the glass of the stem to preshape said fillets, each of said inserts having a lead-accommodating opening therein extending from said recess into said insert, said second end of each of said inserts being in contact with a different one of said lead-weights to retain said primary inserts within said openings in said first mold block of said primary universal stem mold, a secondary universal stem mold including a second mold block having a glass-contacting surface and an oppositely disposed second surface, said secondary fillet-forming means including a plurality of longitudinal fillet-forming openings formed in said glass-contacting surface and extending through said second mold block; and a plurality of secondary inserts replaceably disposed within said openings in said second mold block, each of said inserts having a first end and an oppositely disposed second end with a lead-in conductor orienting recess provided in said first and thereof for directing said lead-in conductor into a lead-accommodating opening extending from said orienting recess into said insert, said secondary insert being spaced from the glass contacting surface of said second mold block, said fillets being shaped by capillary action between the glass of said stem and the wall surrounding said longitudinal fillet-forming openings formed in said second mold block of said secondary upper stem mold assembly, said second end of each of said inserts being in contact with a different one of said lead-weights to retain said secondary inserts within said openings in said second mold block of said secondary universal stem mold.

* * * * *

UNITED STATES PATENT AND TRADEMARK OFFICE
CERTIFICATE OF CORRECTION

PATENT NO.   : 4,813,992
DATED        : March 21, 1989
INVENTOR(S)  : John R. Hale It is certified that error appears in the above-identified patent and that said Letters Patent is hereby corrected as shown below:

Col. 1, line 22, after "forming", change "of" to --or--.

Col. 1, line 62, after "apparatus", change "useed for" to --used to--.

Col. 4, line 2, after "index", add --in--.

Col. 4, line 31, after "a", second occurrence, change "secondary" to --second--.

Col. 8, line 34, after "first", change "and" to --end--.

Signed and Sealed this

Third Day of October, 1989

Attest:

DONALD J. QUIGG

Attesting Officer

Commissioner of Patents and Trademarks